United States Patent [19]

Badesha et al.

[11] Patent Number: 5,753,307
[45] Date of Patent: May 19, 1998

[54] FLUOROELASTOMER SURFACES AND METHODS THEREOF

[75] Inventors: Santokh S. Badesha, Pittsford; David H. Pan; George J. Heeks, both of Rochester; Arnold W. Henry, Pittsford; Victor Berko-Boateng, Penfield; Louis D. Fratangelo, Fairport; Robert M. Ferguson, Penfield, all of N.Y.

[73] Assignee: Xerox Corporation, Stamford, Conn.

[21] Appl. No.: 623,290

[22] Filed: Mar. 28, 1996

[51] Int. Cl.⁶ .................................................. B05D 3/02
[52] U.S. Cl. .................. 427/387; 427/388.2; 427/388.5
[58] Field of Search ........................... 427/387, 388.1, 427/388.2, 388.5, 409

[56] References Cited

U.S. PATENT DOCUMENTS

| | | | |
|---|---|---|---|
| 4,853,737 | 8/1989 | Hartley et al. | 355/289 |
| 5,166,031 | 11/1992 | Badesha et al. | 430/124 |
| 5,217,837 | 6/1993 | Henry et al. | 430/124 |
| 5,281,506 | 1/1994 | Badesha et al. | 430/124 |
| 5,332,641 | 7/1994 | Finn et al. | 430/124 |
| 5,337,129 | 8/1994 | Badesha | 355/275 |
| 5,340,679 | 8/1994 | Badesha et al. | 430/126 |
| 5,366,772 | 11/1994 | Badesha et al. | 428/358 |
| 5,370,931 | 12/1994 | Fratangelo et al. | 428/334 |
| 5,456,987 | 10/1995 | Badesha | 428/421 |

Primary Examiner—Erma Cameron
Attorney, Agent, or Firm—Annette L. Bade

[57] ABSTRACT

Fluoroelastomer surfaces and a method for providing a fluoroelastomer surface on a supporting substrate which includes dissolving a fluoroelastomer; adding a dehydrofluorinating agent; adding an amino silane to form a resulting homogeneous fluoroelastomer solution; and subsequently providing at least one layer of the homogeneous fluoroelastomer solution to the supporting substrate.

20 Claims, 1 Drawing Sheet

FLUOROELASTOMER SURFACES AND METHODS THEREOF

CROSS REFERENCE TO RELATED APPLICATIONS

Attention is directed to the following copending applications assigned to the assignee of the present application. Attorney Docket No. D/94320 U.S. application Ser. No. 08/625,563 filed Mar. 28, 1996, entitled, "Volume Grafted Elastomer Surfaces and Methods Thereof," Attorney Docket No. D/94319 U.S. application Ser. No. 08/623,292 filed Mar. 28, 1996, entitled, "Fluoroelastomer Surfaces and Methods Thereof," Attorney Docket No. D/94356 U.S. application Ser. No. 08/625,566 filed Mar. 28, 1996, entitled, "Fluoroelastomer Members," and Attorney Docket No. D/94356Q U.S. application Serial No. 08/623,273 filed Mar. 28, 1996, entitled, "Fluoroelastomer Members." The disclosures of these applications are hereby incorporated by reference in their entirety.

BACKGROUND OF THE INVENTION

The present invention relates to elastomer surfaces and a process for providing an elastomer surface, and more specifically a fluoroelastomer, hydrofluoroelastomer or VITON® hydrofluoroelastomer surface, on a supporting substrate. The resulting surfaces are useful as surfaces for components in electrostatographic processes, especially xerographic processes, including the surfaces of donor rolls, pressure rolls, fuser rolls, toner transfer belts or roller surfaces and the like. In embodiments, the present invention allows for a decrease in unit manufacturing costs by dispensing with the need for additional coupling and crosslinking agents during the curing process in the overall process for providing a fluoroelastomer surface. Further, with the present process, the final ball milling step is not necessary, resulting in decreased time required for curing and further, resulting in a decrease in cost. The resulting fluoroelastomer surface has sufficient toughness and increased chemical, physical and thermal stability when compared to surfaces cured using known methods.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles which are commonly referred to as toner. The visible toner image is then in a loose powdered form and can be easily disturbed or destroyed. The toner image is usually fixed or fused upon a support which may be the photosensitive member itself or other support sheet such as plain paper.

The use of thermal energy for fixing toner images onto a support member is well known. To fuse electroscopic toner material onto a support surface permanently by heat, it is usually necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, the thermoplastic resin particles are fused to the substrate by heating to a temperature of between about 90° C. to about 200° C. or higher depending upon the softening range of the particular resin used in the toner. It is undesirable, however, to increase the temperature of the substrate substantially higher than about 250° C. because of the tendency of the substrate to discolor or convert into a fire, at such elevated temperatures, particularly when the substrate is paper.

Several approaches to thermal fusing of electroscopic toner images have been described. These methods include providing the application of heat and pressure substantially concurrently by various means, a roll pair maintained in pressure contact, a belt member in pressure contact with a roll, and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip affects the fusing of the toner image onto the support. It is important in the fusing process that no offset of the toner particles from the support to the fuser member take place during normal operations. Toner particles offset onto the fuser member may subsequently transfer to other parts of the machine or onto the support in subsequent copying cycles, thus increasing the background or interfering with the material being copied there. The referred to "hot offset" occurs when the temperature of the toner is increased to a point where the toner particles liquefy and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. To ensure and maintain good release properties of the fuser roll, it has become customary to apply release agents to the fuser roll during the fusing operation. Typically, these materials are applied as thin films of, for example, silicone oils to prevent toner offset.

Particularly preferred fusing systems are comprised of a heated cylindrical fuser roll having a fusing surface which is backed by a cylindrical pressure roll forming a fusing nip therebetween. A release agent donor roll is also provided to deliver release agent to the fuser roll. While the physical and performance characteristics of each of these rolls, and particularly of their functional surfaces are not precisely the same depending on the various characteristics of the fusing system desired, the same classes of materials are typically used for one or more of the rolls in a fusing system in an electrostatographic printing system.

Fusing systems using fluoroelastomers as fuser members are described in U.S. Pat. No. 4,264,181 to Lentz et al., U.S. Pat. No. 4,257,699 to Lentz, and U.S. Pat. No. 4,272,179 to Seanor, all commonly assigned to the assignee of the present invention. The disclosures of these patents are hereby incorporated herein in their entirety.

U.S. Pat. No. 5,017,432, the disclosure of which is hereby incorporated by reference, describes a fusing surface layer obtained from a specific fluoroelastomer, poly (vinylidenefluoride-hexafluoropropylene-tetrafluoroethylene) where the vinylidenefluoride is present in an amount less than 40 weight percent. The patent further discloses curing the fluoroelastomer with VITON® Curative No. 50 (VC-50) available from E.I. Du Pont de Nemours, Inc. which is soluble in a solvent solution of the polymer at low base levels and is readily available at the reactive sites for crosslinking. The patent also discloses use of a metal oxide (such as cupric oxide) in addition to VC-50 for curing.

U.S. Pat. 5,061,965 to Ferguson et al., the disclosure of which is hereby incorporated by reference in its entirety, discloses an elastomer release agent donor layer comprising poly(vinylidenefluoride-hexafluoropropylene-tetrafluoroethylene) and a metal oxide, where the vinylidenefluoride is present in an amount less than 40 weight percent. The release agent donor layer is cured with a nucleophilic curing agent in the presence of an inorganic base.

Generally, the process for providing the elastomer surface on the supporting substrate, e.g., donor roll, pressure roll, fuser roll, toner transfer belt or roller surfaces, includes dissolving the fluoroelastomer in a typical solvent, followed by addition of a dehydrofluorination agent. The dehydrofluorinating agents create double bonds in the backbone which provide crosslinking cites on the fluoroelastomer. Next, a nucleophilic curing agent which incorporates an accelerator and a crosslinking agent is added, followed by addition of the basic metal oxides in particulate form which can act as acid acceptors. The solution is ball milled for extended period of time resulting in the formation of fine dispersion which is then used to fabricate the elastomer surfaces by conventional fabrication techniques. After the elastomer is provided on the substrate, the substrate is subjected to a step heat curing process.

The curing step can be considered an essential part of the preparation of fluoroelastomers surfaces. The level of cure is very important in that it affects the high temperature stability along with both chemical and physical properties of the elastomers. High temperature stability is crucial for fusing subsystem applications, whereas incomplete curing can adversely effect the transfer efficiencies of liquid and dry toners. The details of the curing mechanisms are described in A. L. Lodothetis, "Chemistry Of Fluorocarbon Elastomers", in *Progress in Polymer Science*, Vol. 14: pages 251–296, (1989). There are three known categories of curing agents including diamines and their carbamate salts, peroxides and bisphenol based diols.

The known curing agents have been the basic metal oxides (MgO, and Ca(OH)$_2$) and aliphatic and aromatic amines, where the aromatic groups may be benzene, toluene, naphthalene, anthracene, etc. In the diamine category, hexamethylenediamine is the most commonly used curing agent. The particularly preferred curing agents are the nucleophilic curing agents such as VC-50 which incorporates an accelerator (such as a quaternary phosphonium salt or salts) and a crosslinking agent (bisphenol AF). VC-50 is preferred due to the more thermally stable product it provides. The metal oxides like MgO here serve as acid acceptors. However, the basic metal oxides can be used as either the dehydrofluorinating agent or as a curing agent.

Examples of known peroxide curing agents include bis (2,4-dichlorobenzoyl) peroxide, di-benzoyl peroxide, di-cumyl peroxide, di-tertiary butyl peroxide, and 2,5-dimethyl-2,5-bis (t-butyl peroxy) hexane. Fluorocarbon free radical peroxide cures usually incorporate a cure site monomer, CSM, ( e.g. bromotrifluoroethylene ) as a reactivity site on the fluorocarbon polymer backbone and use a coagent such as triallyisocyanurate, TAIC, as the bridging crosslink to form the network. The three allyl groups in the TAIC are the bonding sites in the crosslinker and produce a three dimensional network. Heat (and possibly pressure) can be used to induce a peroxide (e.g. 2,5-bis -(t-butylperoxy)-2,5-dimethylhexane) to split into radicals. This, in turn, initiates radical formation at the CSM of polymer chains and in the allyl groups of the TAIC. The TAIC then combines with the polymer radical intermediates producing a crosslinked elastomer. Metal oxides such as MgO and Ca(OH)$_2$ can scavenge any hydrogen fluoride that could be generated.

Known curing processes such as those mentioned herein require the addition of curing agents and crosslinking agents, in addition to dehydrofluorinating agents. These curing and crosslinking agents increase the cost of the curing process immensely. In addition, when metal oxides are used, a ball milling step is normally required. The ball milling step can be an extremely costly and time consuming procedure, requiring anywhere from 2 to 24 hours. In addition, the curing procedure must be followed very carefully and in specific detail in order to form fluoroelastomers with sufficient chemical, physical and thermal stability, along with sufficient toughness.

Therefore, a more cost effective and less time consuming method of providing a fluoroelastomer surface, which results in elastomers having sufficient toughness as well as sufficient chemical, physical, and thermal stability is desired.

SUMMARY OF THE INVENTION

Examples of objects of the present invention include:

It is an object of the present invention to provide electophotographic components and methods with many of the advantages indicated herein.

It is another object of the present invention to provide a fluoroelastomer surface together with a method for providing the fluoroelastomer surface on a supporting substrate which does not require the use of additional coupling and crosslinking agents.

Yet another object of the present invention is to provide a fluoroelastomer surface together with a method for providing the fluoroelastomer surface on a supporting substrate wherein a curative, which requires redispersing is avoided.

Still yet another object of the present invention is to provide an economical fluoroelastomer surface together with a method for providing the fluoroelastomer surface on a supporting substrate which does not require a time consuming and costly ball milling step.

It is further an object of the present invention to provide a fluoroelastomer surface which has sufficient chemical, physical and thermal stability, along with sufficient toughness.

Another object of the present invention is to provide a fluoroelastomer surface and a method for providing a fluoroelastomer surface on a supporting substrate which is more cost effective than known methods.

Many of the above objects have been met by the present invention, in embodiments, which includes: a method for providing a fluoroelastomer surface on a supporting substrate comprising: a) dissolving a fluoroelastomer; b) adding a dehydrofluorinating agent; c) adding an amino silane in an amount of from about 0.5 to about 10 weight percent based on the weight of the fluoroelastomer in order to form a resulting homogeneous fluoroelastomer solution; and d) subsequently providing at least one layer of the homogeneous fluoroelastomer solution to the supporting substrate.

The fluoroelastomer surface provided by this method, the embodiments of which are further described herein, exhibits sufficient chemical, physical and thermal stability, along with sufficient toughness without the need for additional costly materials such as coupling and crosslinking agents, and without the time consuming and costly ball milling step.

DETAILED DESCRIPTION OF THE PRESENT INVENTION

Figure 1:
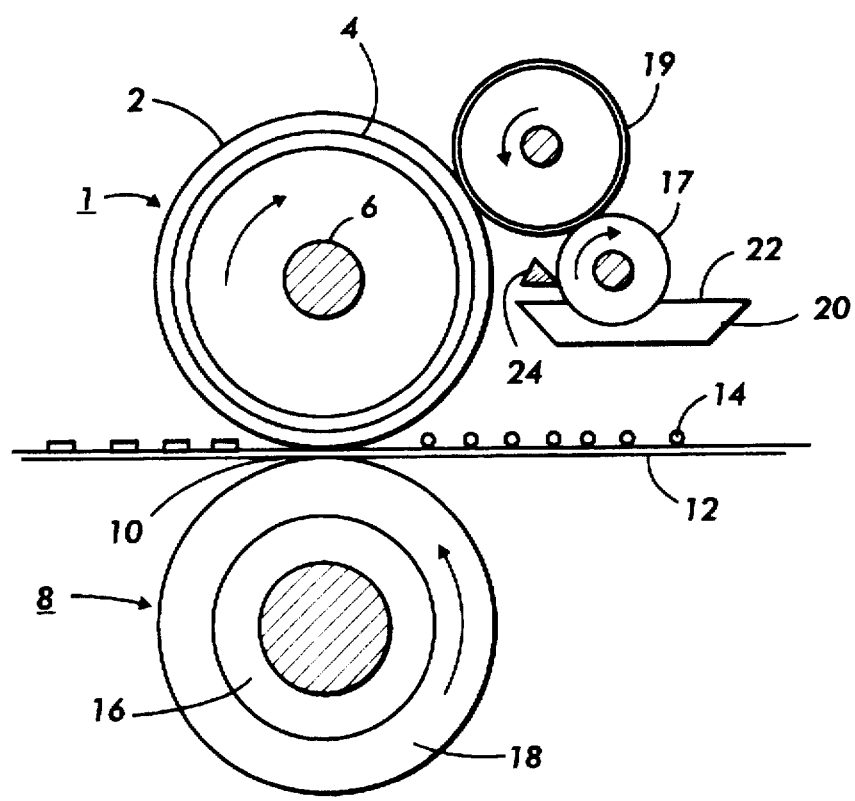
FIG. 1 represents a sectional view of a fuser system which may use the fuser member of the present invention.

A known fusing system is comprised of a heated cylindrical fuser roll having a fusing surface which is backed by a cylindrical pressure roll forming a fusing nip therebetween. A release agent donor roll is also provided to deliver release agent to the fuser roll. While the physical and performance characteristics of each of these rolls, and particularly of their functional surfaces are not precisely the same depending on the various characteristics of the fusing system desired, the same classes of materials are typically used for one or more of the rolls in a fusing system in an electrostatographic printing system.

The present process, in embodiments, enables surfaces as described in conjunction with a fuser assembly as shown in FIG. 1 where the numeral 1 designates a fuser roll comprising elastomer surface 2 upon a suitable base member 4, a hollow cylinder or core fabricated from any suitable metal, such as aluminum, anodized aluminum, steel, nickel, copper, and the like, having a suitable heating element 6 disposed in the hollow portion thereof which is coextensive with the cylinder. Backup or pressure roll 8 cooperates with fuser roll 1 to form a nip or contact arc 10 through which a copy paper or other substrate 12 passes such that toner images 14 thereon contact elastomer surface 2 of fuser roll 1. As shown in FIG. 1, the backup roll 8 has a rigid steel core 16 with an elastomer surface or layer 18 thereon. Sump 20 contains polymeric release agent 22 which may be a solid or liquid at room temperature, but it is a fluid at operating temperatures.

In the embodiment shown in FIG. 1 for applying the polymeric release agent 22 to elastomer surface 2, two release agent delivery rolls 17 and 19 mounted in the direction indicated are provided to transport release agent 22 to elastomer surface 2. Delivery roll 17 is partly immersed in the sump 20 and transports on its surface release agent from the sump to the delivery roll 19. By using a metering blade 24, a layer of polymeric release fluid can be applied initially to delivery roll 19 and subsequently to elastomer 2 in controlled thickness ranging from submicrometer thickness to thickness of several micrometers of release fluid. Thus, by metering device 24, about 0.1 to 2 micrometers or greater thicknesses of release fluid can be applied to the surface of elastomer 2.

Examples of the fluoroelastomers useful in the practice of the present invention are those described in detail in U.S. Pat. Nos 5,166,031, 5,281,506, 5,366,772, 5,370,931, 4,257, 699, 5,017,432 and 5,061,965, the disclosures of which are incorporated by reference herein in their entireties. As described therein these fluoroelastomers, particularly from the class of copolymers and terpolymers of vinylidenefluoride hexafluoropropylene and tetrafluoroethylene, are known commercially under various designations as VITON A®, VITON B®, VITON E®, VITON E60C®, VITON E430®, VITON 910®, VITON GH® and VITON GF®. The VITON® designation is a Trademark of E.I. Du Pont de Nemours, Inc. Other commercially available materials include FLUOREL 2170®, FLUOREL 2174®, FLUOREL 2176®, FLUOREL 2177® and FLUOREL LVS 76® FLUOREL® being a Trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF®, NM® FOR-THF®, FOR-TFS®, TH®, TN505® available from Montedison Specialty Chemical Company. Some VITON compositions contain small amounts of a bromine terminated olefin as a cure site monomer. This allows for curing with dinucleophiles or peroxides.

In a preferred embodiment, the fluoroelastomer is one having a relatively low quantity of vinylidenefluoride, such as in VITON GF®, available from E.I. Du Pont de Nemours, Inc. The VITON GF® has 35 weight percent of vinylidenefluoride, 35 weight percent of hexafluoropropylene and 29 weight percent of tetrafluoroethylene with 2 weight percent cure site monomer. The amount of fluoroelastomer used to provide the surface of the present invention is dependent on the amount necessary to form the desired thickness of the layer or layers of surface material. Specifically, in embodiments, the fluoroelastomer is added in an amount of from about 1 to about 75 percent, preferably about 5 to about 30 percent by weight of total solids. Total solids as used herein refers to the total amount by weight of fluoroelastomer, solvent and any additives or adjuvants.

Any known solvent suitable for dissolving a fluoroelastomer may be used in the present invention. Examples of suitable solvents include organic solvents such as alkyl ketones like methyl ethyl ketone, methyl isobutyl ketone and the like. The solvent is used in an amount sufficient to dissolve the fluoroelastomer. Specifically, for example, the solvent is added in an amount of from about 25 to about 99 weight percent, preferably from about 70 to about 95 weight percent. The fluoroelastomer is dissolved in the solvent by known means such as by stirring. It is preferred to stir the mixture vigorously by hand or by using a mechanical stirrer. The stirring should continue for an effective period, for example, from about 1 to about 10 hours, preferably from about 2 to about 5 hours.

The dehydrofluorinating agent which attacks the fluoroelastomer generating unsaturation is selected from the group of strong nucleophilic agents such as peroxides, hydrides, bases, oxides, and the like. Examples of strong nucleophilic agents include primary, secondary and tertiary, aliphatic and aromatic amines, where the aliphatic and aromatic amines have from about 2 to about 15 carbon atoms. Also included are aliphatic and aromatic diamines and triamines having from about 2 to about 15 carbon atoms where the aromatic groups may be benzene, toluene, naphthalene, anthracene, and the like. It is generally preferred for the aromatic diamines and triamines that the aromatic group be substituted in the ortho, meta and para positions. Typical substituents include lower alkyl amino groups such as ethylamino, propylamino and butylamino, with propylamino being preferred. In the present invention, it is preferred to use basic metal oxides as the dehydrofluorinating agents. Specifically preferred are MgO and Ca(OH)$_2$.

The dehydrofluorinating agent (basic metal oxides) is added to the dissolved fluoroelastomer in various effective amounts, for example, of from about 1 to about 20 percent by weight, and preferably from about 2 to about 10 percent based on the weight of the fluoroelastomer. The resulting solution can be roll milled to form small particles of from about 1 to about 10 microns, and preferably from about 2 to about 5 microns in diameter. The roll milling should be conducted for at least about 10 hours, and preferably from about 15 to about 20 hours in embodiments.

The amino silane compound is used during the preparation of the fluoroelastomer. An amino silane can be used as the dehydrofluorinating agent, in addition to functioning as a curative. When an amino silane is added as the dehydrofluorinating agent, the residual amino silane compound in the reaction mixture can also serve as a curative. In this embodiment, no additional curing agent is needed to cure the fluoroelastomer. Alternatively, an amino silane can be added as the curing agent after formation of the fluoroelastomer. In this embodiment, the dehydrofluorinating agent can be an amino silane or can be other than an amino silane. It is preferred that when the amino silane is added as the curing agent, that a basic metal oxide (or metal hydroxide) such as $Ca(OH)_2$ or MgO can be used as the dehydrofluorinating agent. Specifically, the amino silane is of the general formula $NH_2(CH_2)_n NH(CH_2)_m Si[(OR)_t(R')_w]$, wherein n and m represent repeating units of the segment and are numbers of from about 1 to about 20, and preferably from about 2 to about 6; t+w=3; R and R' are an aliphatic chain having for example from about 1 to about 20 carbon atoms (for example, methyl, ethyl, propyl, butyl, and the like), or an aromatic group of from about 6 to about 24 and the like carbons (for example in embodiments, benzene, tolyl, xylyl, and the like). Examples of amino silanes include 4-aminobutyldimethyl methoxysilane, 4-aminobutyl triethoxysilane, (aminoethylaminomethyl)phenyl triethoxysilane, N-(2-aminoethyl)-3-aminopropylmethyl dimethoxysilane, N-(2-aminoethyl)-3-aminopropyl trimethoxysilane, N-(2-aminoethyl)-3-aminopropyl tris(2-ethyl-hexoxy)silane, N-(6-aminohexyl)aminopropyl-trimethoxysilane, 3-(1-aminopropoxy)-3,3-dimethyl-1-propenyl-trimethoxysilane, 3-aminopropyl tris (methoxyethoxyethoxy)-silane, 3-aminopropyldimethyl ethoxysilane, 3-aminopropylmethyl diethoxysilane, 3-aminopropyl diisopropylethoxysilane, 3-aminopropyl triethoxysilane, 3-aminopropyl trimethoxysilane, and 3-Aminopropyltris (trimethylsiloxy)silane. Preferred amino silanes include 3-(N-styrylmethyl-2-aminoethyl) trimethoxy silane, (S-1580, available from Huls of America, Inc. Piscataway, N.J. in its hydrochloride), N-(2-aminoethyl-3-aminopropyl)-trimethoxy silane (AO700, available from Huls of America), and (aminoethyl aminomethyl) phenyl trimethoxy silane (also available from Huls of America).

The amino silane as a curative and/or a dehydrofluorinating agent is present in the reaction mixture in an amount of from about 0.5 to about 10 percent based on the weight of fluoroelastomer. It is preferable that the amino silane be present in an amount of from about 1 to about 5 weight percent. Specifically preferred amounts are from about 1 to about 2 weight percent.

It is preferred that basic metal oxides be used as the dehydrofluorinating agent at the beginning of the process for providing a fluoroelastomer surface, and that the amino silane be selected as the curing agent.

Although the mechanism of reaction by use of the amino silane is not exactly known, the amino compounds act as both a crosslinker and a coupler. Therefore, there is no need for additional couplers and crosslinkers to be added during the curing process. Specifically, the amino silane is an aminoalkyl functional silane, and has an amine functionality at one end and trialkoxysilane at the other. The dual functionality of the amino silane suggests that the amine is chemically bonded to fluoropolymer, allowing the trialkyl silane functionality to bring about a condensation reaction between fluoropolymer molecules under certain conditions. In contrast, the most probable mechanism for VC-50 and other known curatives is that the crosslinking of fluoropolymer chains occurs through a single reactive functionality.

After the amino silane is added to the reaction mixture of dehydrofluorinating agent and dissolved fluoroelastomer, the mixture is stirred or shaken for a short period of time, for example, of from about 1 to about 10, preferably 5 minutes. It is preferred that the solids content be reduced to from about 1 to about 20 percent, preferably from about 5 to about 10 percent.

Other adjuvants and fillers may be incorporated in the elastomer in accordance with the present invention as long as they do not affect the integrity of the fluoroelastomer. Such fillers normally encountered in the compounding of elastomers include coloring agents, reinforcing fillers, and processing aids. Oxides such as copper oxides may be added in certain amounts to fuser roll coatings to provide sufficient anchoring sites for functional release oils, and thereby allow excellent toner release characteristics from such members.

The substrate for the fusing member, including donor fuser rolls and pressure fuser rolls, according to the present invention may be of any suitable material. Typically, it takes the form of a cylindrical tube of aluminum, copper, steel or certain plastic materials chosen to maintain rigidity, structural integrity, as well as being capable of having the silicone elastomer coated thereon and adhered firmly thereto. It is preferred that the supporting substrate is a cylindrical sleeve having an outer layer of from about 1 to about 6 mm. In one embodiment, the core which may be a steel cylinder is degreased with a solvent and cleaned with an abrasive cleaner prior to being primed with a primer, such as Dow Corning 1200, which may be sprayed, brushed or dipped, followed by air drying under ambient conditions for thirty minutes and then baked at 150° C. for 30 minutes.

Optional intermediate adhesive layers and/or elastomer layers in effective amounts may be applied to achieve the desired properties and performance objectives of the present invention. An adhesive layer may be selected from, for example, epoxy resins and amino silanes. Preferred adhesives are proprietary materials such as THIXON 403/404, Union Carbide A-1100, Dow TACTIX 740, Dow TACTIX 741, and Dow TACTIX 742. A particularly preferred curative for the aforementioned adhesives is Dow H41.

A silicone elastomer intermediate layer may be applied according to conventional techniques such as injection molding and casting after which it is cured for up to 15 minutes and at 120° to 180° C. to provide a complete cure without a significant post cure operation. This curing operation should be substantially complete to prevent debonding of the silicone elastomer from the core when it is removed from the mold. Thereafter, the surface of the silicone elastomer is sanded to remove the mold release agent and it is wiped clean with a solvent such as isopropyl alcohol to remove all debris. The intermediate layer can also be prepared from fluoroelastomers like VITON GF®, wherein a typical composition is prepared, for example, by adding 30 parts per 100 parts of VITON GF® carbon black like REGAL N991®, followed by rubber milling in a Banbury Mixer and thereafter, injection molded onto a metal core. Alternatively, the intermediate layer may be formed in accordance with the present invention. The thickness of the intermediate layer is from about 0.5 to about 20 mm, preferably from about 1 to about 5 mm.

The resulting fluoroelastomer solution is then used to fabricate the outer layer of a fuser member by conventional solution coating methods spraying, dipping, flow coating, or the like. The coating thickness can vary depending upon specific applications from about 25 to about 75 micrometers thick. The coating is first air dried and then step heat cured in air. For fuser application, the thickness of the dry fluoroelastomer layer could be any suitable thickness, preferably between about 35 to about 50 micrometers.

This thickness range is selected to provide a layer thin enough to prevent a large thermal barrier for fusing and thick enough to allow a reasonable wear life. While molding, extruding and wrapping techniques are alternative means which may be used, it is preferred to spray successive applications of the solvent solution. When the desired thickness of coating is obtained, the coating is cured and thereby bonded to the roll surface. When the desired thickness of coating is obtained, the coating is cured and thereby bonded to the roll surface.

The curing time is, in embodiments, from about 30 minutes to about 24 hours, and preferred is from about 4 to about 10 hours. The temperature for curing is, for example, from about 100 to about 250° C., preferably from about 150 to about 230° C.

The present invention greatly reduces the cost and time associated with providing a fluoroelastomer surface on a supporting substrate. Specifically, the present invention dispenses with the additional costs associated with materials which were previously necessary to effect curing, such as the coupling and crosslinking agents. The basic metal oxides function as the dehydrofluorinating agent and the amino silane as the curing agent. In addition, a significant cost associated with the curing process is the final ball milling step. By dispensing with the need for the final ball milling step, the present invention enables a costs saving. Accordingly, the unit manufacturing costs can be reduced substantially with embodiments of the present invention.

In addition to cost reduction and time savings, with embodiments of the present invention there is provided a fluoroelastomer surface with sufficient chemical, physical and thermal stability, as well as increased toughness.

All the patents and applications referred to herein are hereby specifically, and totally incorporated herein by reference in their entirety.

The following Examples further define and describe embodiments of the present invention. Unless otherwise indicated, all parts and percentages are by weight.

EXAMPLES

The Viton used in the following examples was obtained from DuPont and is sold under the trademark name Viton GF®. The amino silane N-(2-aminoethyl-3-aminopropyl) trimethoxy silane) was obtained from Huls of America Inc, Piscataway, N.J.

Preparation of fluoroelastomer stock solution

A stock solution of the fluoroelastomer was prepared by dissolving 2,500 grams of Viton GF® in 25 liters of methylethyl ketone (MEK), by stirring at room temperature (25° C.). This is accomplished by vigorous stirring using a mechanical stirrer. Approximately 2 to 4 hours were needed to accomplish the dissolution depending upon the intensity of stirring. The resulting solution was then used as stock solution to prepare fluoroelastomer films.

Example 1
Curing of Viton GF with VC-50

To 500 grams of the above fluoroelastomer stock solution, 1.1 grams of MgO and 0.55 grams of Ca(OH)$_2$ were added to a jar containing ceramic balls followed by roll milling for 17–24 hours until fine particles of an oxide dispersion of about 3 to 5 microns in diameter were obtained. Subsequently, 2.5 grams of DuPont Curative VC-50 in 22.5 grams of the methyl ethylketone (MEK) were added to the above dispersion, shaken for about 15 to 20 minutes and the solid content reduced to 5 to 7 percent by the addition of MEK. Following hand mixing, the mixture was air sprayed on to aluminum sheets. The films after air drying overnight, (about 18 hours) were then removed from the aluminum substrates and cured using a standard step heat method. The typical step curing process is heating for 2 hours at 93° C., followed by 2 hours at 149° C., followed by 2 hours at 177° C., followed by 2 hours at 208° C., and 16 hours at 232° C. The physical properties of the product film were determined by using an Instron Tensile Test Machine. The physical properties of the product film were as follows: toughness 1642 in-lb/in$^3$; initial modulus 350 psi; elongation 581 percent. The film was heat aged at 400° F. in air for 8 weeks and the changes in mechanical properties were determined again by an Instron. The toughness was found to be 1594 in-lb/in$^3$; initial modulus 340 psi; elongation 595 percent. The details of the mechanical properties are given in Table 1 below.

TABLE 1

| Composition | Toughness (in–lb/in$^3$) | Ultimate Elongation (%) |
|---|---|---|
| Viton + Oxides + 5% VC-50 | 1642 | 581 |
| Viton + Oxides + 5% VC-50 (8 weeks at 400° F.) | 1594 | 595 |

Example 2
Curing of Viton GF with A0700

To 500 grams of the original fluoroelastomer stock solution, 1.1 grams of (MgO) and 0.55 grams of (Ca(OH)$_2$ were added to a jar containing ceramic balls followed by roll milling for 17–24 hours until fine particles of oxide of from about 3 to 5 microns in diameter were obtained. Subsequently, 1.0 grams of aminosilane (A0700) obtained from Huls Of America Inc., Piscataway, N.J. was added to the above dispersion, the mixture shaken for about 5 minutes, and the solid content reduced to 5 to 7 percent by the addition of MEK. The mixture was then air sprayed onto aluminum sheets. After air drying overnight, the films were then removed from the aluminum substrates and cured using the standard step heat method. The typical step curing process is heating for 2 hours at 93° C., followed by 2 hours at 149° C., followed by 2 hours at 177° C., followed by 2 hours at 208° C., and 16 hours at 232° C. The physical properties were determined by using Instron. The physical properties of this film were as follows: toughness 3113 in-lb/in$^3$; initial modulus 956 psi; elongation 539 percent. The film was heat aged at 400° F. in air for 8 weeks and the changes in mechanical properties were determined by an Instron. The toughness was found to be 2561 in-lb/in$^3$; initial modulus 799 psi; elongation 574 percent. The details of the mechanical properties are given in Table 2 below.

TABLE 2

| Composition | Toughness (in–lb/in$^3$) | Ultimate Elongation (%) |
|---|---|---|
| Viton + Oxides + 2% AO700 | 3113 | 539 |
| Viton + Oxides + 2% AO700 (8 weeks, 400° F.) | 2561 | 574 |

Example 3
Curing of Viton with VC-50 (metal oxides ball milled separately)

Part A solution was prepared by adding 2.5 grams of DuPont Curative VC-50 in 22.5 grams of the methyl ethylketone (MEK) to 500 grams of the stock fluoroelastomer solution. The contents were shaken for about 5 minutes in a flask to ensure complete mixing. Part B was prepared by adding 50 grams of MEK, 1.1 grams of MgO, and 0.55 grams of Ca(OH)$_2$ to a jar containing ceramic balls followed by roll milling for 24 hours until a fine particle dispersion of oxide having from about 3 to 5 microns in diameter was obtained. Part A was then mixed with Part B and the mixture was stirred vigorously for 10 minutes. The resulting dispersion was air sprayed onto aluminum substrates after which the films were cured and heat aged as described in Examples 1 and 2. The changes in the mechanical properties were measured by Instron. The toughness changed from 2329 to 1691 in-lb/in$^3$; initial modulus changed from 559 to 510 psi; and the elongation changed from 602 to 540 percent. The details of the mechanical properties are provided in Table 3 below.

TABLE 3

| Composition | Toughness (in–lb/in$^3$) | Ultimate Elongation (%) |
|---|---|---|
| Viton + Oxides + 5% VC-50 (added prior to spray) | 2329 | 602 |
| Viton + Oxides + 5% VC-50 (prior to spray) (8 weeks, 400° F.) | 1691 | 540 |

Example 4
Curing of Viton with A0700 (metal oxides ball milled separately)

Part A solution was prepared by adding 1.0 grams of an aminosilane (A0700) obtained from Huls Of America Inc., Piscataway, N.J. to 500 grams of the stock fluoroelastomer solution. The contents were shaken for about 5 minutes to ensure complete mixing. Part B was prepared by adding 50 grams of MEK, 1.1 grams of MgO, and 0.55 grams of Ca(OH)$_2$ to a jar containing ceramic balls followed by roll milling for 24 hours until a fine particle dispersion of oxide having from about 3 to 5 microns in diameter was obtained. Part A was then mixed with Part B. After stirring vigorously for 10 minutes, the resulting dispersion was air sprayed onto aluminum substrates. The films were then cured and heat aged as described in Example 1 and 2. The changes in the mechanical properties were followed by Instron. The toughness changed from 2294 to 1912 in-lb/in$^3$; initial modulus changed from 805 to 487 psi; and the elongation changed 544 to 524 percent. The details of the mechanical properties are given in Table 4 below.

TABLE 4

| Composition | Toughness (in–lb/in$^3$) | Ultimate Elongation (%) |
|---|---|---|
| Viton + Oxides + 2% AO700 (added prior to spray) | 2294 | 544 |
| Viton + Oxides + 2% AO700 (prior to spray) (8 weeks, 400° F.) | 1912 | 524 |

The above data evidences, for example, that the disclosed method of curing fluoroelastomers using amino silane as the curative results in a fluoroelastomer surface having increased toughness as compared to a fluoroelastomer surface cured by known methods such as by use of the standard curing agent VC-50. In addition, the above results demonstrate that upon subjecting the cured fluoroelastomer to elements such as heat for a relatively long period of time, the mechanical properties of the material were virtually unaffected. Therefore, fluoroelastomers cured by the invention process have increased thermal stability as well as sufficient toughness as compared to fluoroelastomers cured by known procedures. In addition, because the present process dispenses with the need for additional curing and crosslinking agents, there is a significant cost savings. Moreover, there is no need for a ball milling step in the process herein, resulting in a cost savings, as well as a reduction time required for cure.

While the invention has been described in detail with reference to specific and preferred embodiments, it will be appreciated that various modifications and variations will be apparent to the artisan. All such modifications and embodiments as may readily occur to one skilled in the art are intended to be within the scope of the appended claims.

We claim:

1. A method for providing a fluoroelastomer surface on a supporting substrate comprising in sequential order:
   a) dissolving a fluoroelastomer;
   b) adding a dehydrofluorinating agent to said dissolved fluoroelastomer;
   c) adding and reacting an amino silane in an amount of from about 0.5 to about 10 percent based on the weight of said fluoroelastomer to the product of (b) to form a homogeneous fluoroelastomer solution; and
   d) subsequently providing at least one layer of said homogeneous fluoroelastomer solution to said supporting substrate.

2. A method in accordance with claim 1, wherein the dehydrofluorinating agent is a metal oxide or metal hydroxide.

3. A method in accordance with claim 2, wherein the metal oxide or metal hydroxide is selected from the group consisting of calcium hydroxide and magnesium oxide.

4. A method in accordance with claim 2, wherein the metal oxide or metal hydroxide is added in an amount of from about 1 to about 20 weight percent based on the weight of the fluoroelastomer.

5. A method in accordance with claim 4, wherein the amount of metal oxide or metal hydroxide is from about 2 to about 10 weight percent based on the weight of the fluoroelastomer.

6. A method in accordance with claim 1, wherein the amino silane is of the formula NH$_2$(CH$_2$)$_n$NH(CH$_2$)$_m$Si[(OR)$_t$(R')$_w$], wherein n and m are from about 1 to about 20; t+w=3; and R and R' are an aliphatic hydrocarbon chain with from about 1 to about 20 carbon atoms or an aromatic group with from about 6 to about 24 carbons.

7. A method in accordance with claim 6, wherein the amino silane is selected from the group consisting of N-(2-aminoethyl-3-aminopropyl)-trimethoxy silane, [3-(N-strylmethyl-2-aminoethylamino) propyltrimethoxy silane hydrochloride and (aminoethylamino methyl) phenethytrimethoxy] 3-(N-styrylmethyl-2-aminoethyl aminopropyl) trimethoxy silane, (aminoethyl aminomethyl) phenyl trimethoxy silane, and (aminoethyl aminomethyl) phenyl triethoxy silane.

8. A method in accordance with claim 1, wherein the amount of amino silane is from about 1 to about 5 weight percent.

9. A method in accordance with claim 8, wherein the amount of amino silane is from about 1 to about 2 weight percent.

10. A method in accordance with claim 1, wherein the fluoroelastomer is selected from the group consisting of (1) a class of copolymers of vinylidenefluoride and hexafluoropropylene and (2) a class of terpolymers of vinylidenefluoride, hexafluoropropylene and tetrafluoroethylene.

11. A method in accordance with claim 1, wherein the fluoroelastomer is selected from the group consisting of poly(vinylidene fluoride-hexafluoropropylene) and poly(vinylidene fluoride-hexafluoropropylene-tetrafluoroethylene).

12. A method in accordance with claim 1, wherein the fluoroelastomer comprises 35 weight percent of vinylidenefluoride, 34 weight percent of hexafluoropropylene and 29 weight percent of tetrafluoroethylene.

13. A method in accordance with claim 1, wherein the fluoroelastomer is added in an amount of from about 1 to about 75 percent by weight based on the weight of total solids.

14. A method in accordance with claim 13, wherein the fluoroelastomer is added in an amount of from about 5 to about 30 percent by weight based on the weight of total solids.

15. A method in accordance with claim 1, wherein dissolving the fluoroelastomer is accomplished in an organic solvent.

16. A method in accordance with claim 15, wherein the fluoroelastomer is dissolved in a solvent selected from the group consisting of methyl ethyl ketone and methyl isobutyl ketone.

17. A method in accordance with claim 1, wherein said homogeneous fluoroelastomer solution provided on said supporting substrate is heat cured.

18. A method in accordance with claim 17, wherein said heat curing occurs at a temperature of from about 100 to about 250° C. for a time of from about 30 minutes to about 24 hours.

19. A method in accordance with claim 18, wherein the temperature is from about 150 to about 250° C. for from about 4 to about 10 hours.

20. A method for providing a fluoroelastomer surface on a supporting substrate comprising in sequential order:

a) dissolving a fluoroelastomer;

b) adding a dehydrofluorinating agent to said dissolved fluoroelastomer;

c) adding and reacting an amino silane having the formula $NH_2(CH_2)_nNH(CH_2)_mSi[(OR)_t(R')_w]$, wherein n and m are from about 1 to about 20, t+w=3; and R and R' are an aliphatic hydrocarbon chain with from about 1 to about 20 carbon atoms or an aromatic group with from about 6 to about 24 carbons, in an amount of from about 0.5 to about 10 percent based on the weight of said fluoroelastomer to the product of (b) to form a homogeneous fluoroelastomer solution; and d) subsequently providing at least one layer of said homogeneous fluoroelastomer solution to said supporting substrate.

* * * * *